(12) United States Patent
Bishop et al.

(10) Patent No.: US 10,521,416 B2
(45) Date of Patent: Dec. 31, 2019

(54) INCREMENTALLY RETRIEVING DATA FOR OBJECTS TO PROVIDE A DESIRED LEVEL OF DETAIL

(71) Applicant: International Business Machines Corporation, Armonk, NY (US)

(72) Inventors: Thomas P. Bishop, Austin, TX (US); Kevin Chee, Austin, TX (US); Jordan R. McCoy, Austin, TX (US); Jozsef Szalay, Austin, TX (US); Michael T. Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 14/631,244

(22) Filed: Feb. 25, 2015

(65) Prior Publication Data
US 2015/0278340 A1    Oct. 1, 2015
US 2017/0364546 A9    Dec. 21, 2017

Related U.S. Application Data

(63) Continuation of application No. 14/228,925, filed on Mar. 28, 2014.
(Continued)

(51) Int. Cl.
*G06F 17/30*     (2006.01)
*G06F 16/23*     (2019.01)
(Continued)

(52) U.S. Cl.
CPC ...... *G06F 16/2365* (2019.01); *G06F 16/1734* (2019.01); *G06F 16/21* (2019.01);
(Continued)

(58) Field of Classification Search
CPC .......... G06F 17/30539; G06F 2216/03; G06F 17/30864; G06F 17/30613; G06F 17/30572; G06F 17/30699; G06N 3/08
(Continued)

(56) References Cited

U.S. PATENT DOCUMENTS 6,012,067 A    1/2000    Sarkar
6,219,670 B1   4/2001    Mocek et al.
(Continued)

FOREIGN PATENT DOCUMENTS

CN    102385615 A    3/2012
CN    102937970 A    2/2013
(Continued)

OTHER PUBLICATIONS

Taiwan Office Action dated Aug. 19, 2016, 6 pages.
(Continued)

*Primary Examiner* — Alexandria Y Bromell
(74) *Attorney, Agent, or Firm* — Richard Wilhelm; Edell, Shapiro & Finnan, LLC

(57) ABSTRACT

A computer-implemented method is provided, for retrieving data and metadata according to a data harvesting criteria into an indexed repository, comprising providing a user interface allowing a user to define data harvesting criteria for adjusting a subset of data and metadata on an indexed repository. Responsive to a user utilizing the user interface by defining the data harvesting criteria, the subset of data and metadata on the indexed repository is adjusted according to the data harvesting criteria.

6 Claims, 12 Drawing Sheets

Related U.S. Application Data

(60) Provisional application No. 61/866,258, filed on Aug. 15, 2013, provisional application No. 61/866,202, filed on Aug. 15, 2013.

(51) Int. Cl.
| | |
|---|---|
| *G06F 16/21* | (2019.01) |
| *G06F 16/28* | (2019.01) |
| *G06F 16/335* | (2019.01) |
| *G06F 16/17* | (2019.01) |
| *G06F 16/22* | (2019.01) |
| *G06F 16/9535* | (2019.01) |
| *G06F 16/2457* | (2019.01) |
| *G06F 16/9032* | (2019.01) |

(52) U.S. Cl.
CPC .... *G06F 16/2228* (2019.01); *G06F 16/24573* (2019.01); *G06F 16/285* (2019.01); *G06F 16/335* (2019.01); *G06F 16/90332* (2019.01); *G06F 16/9535* (2019.01)

(58) Field of Classification Search
USPC ........... 707/776, 709, 711, 741, 754, 756; 706/25
See application file for complete search history.

(56) References Cited

U.S. PATENT DOCUMENTS

| | | | |
|---|---|---|---|
| 6,263,334 B1 | 7/2001 | Fayyad et al. | |
| 6,745,176 B2 | 6/2004 | Probert, Jr. et al. | |
| 6,826,553 B1* | 11/2004 | DaCosta | G06F 17/30867 |
| | | | 707/707 |
| 6,954,758 B1 | 10/2005 | O'Flaherty | |
| 7,219,099 B2 | 5/2007 | Kuntala et al. | |
| 7,305,389 B2 | 12/2007 | Zeng et al. | |
| 7,676,553 B1 | 3/2010 | Laucius et al. | |
| 7,685,083 B2* | 3/2010 | Fairweather | G06F 8/427 |
| | | | 706/45 |
| 7,702,690 B2 | 4/2010 | Brave et al. | |
| 7,756,881 B2 | 7/2010 | Crivat et al. | |
| 7,801,894 B1* | 9/2010 | Bone | G06F 17/30091 |
| | | | 707/737 |
| 7,844,582 B1* | 11/2010 | Arbilla | G06F 21/554 |
| | | | 707/694 |
| 7,856,434 B2 | 12/2010 | Gluzman Peregrine | |
| 7,895,191 B2 | 2/2011 | Colossi et al. | |
| 7,930,197 B2 | 4/2011 | Ozzie et al. | |
| 7,953,694 B2 | 5/2011 | Colossi et al. | |
| 8,046,338 B2 | 10/2011 | Basso et al. | |
| 8,200,569 B1 | 6/2012 | Zerenner et al. | |
| 8,447,722 B1* | 5/2013 | Ahuja | G06F 21/606 |
| | | | 707/607 |
| 2001/0056429 A1 | 12/2001 | Moore | |
| 2004/0125131 A1 | 7/2004 | Phelps | |
| 2004/0220944 A1 | 11/2004 | Behrens et al. | |
| 2005/0138109 A1* | 6/2005 | Redlich | G06F 17/30699 |
| | | | 709/201 |
| 2005/0273667 A1* | 12/2005 | Shrivastava | G06F 11/0709 |
| | | | 714/47.2 |
| 2005/0278708 A1 | 12/2005 | Zhao et al. | |
| 2005/0289168 A1 | 12/2005 | Green et al. | |
| 2005/0289524 A1 | 12/2005 | McGinnes | |
| 2006/0161556 A1 | 7/2006 | Dettinger et al. | |
| 2007/0185904 A1 | 8/2007 | Matsuzawa et al. | |
| 2007/0214135 A1* | 9/2007 | Crivat | G06F 16/2465 |
| | | | 707/707 |
| 2008/0027893 A1 | 1/2008 | Cavestro et al. | |
| 2008/0147641 A1* | 6/2008 | Leffingwell | G06F 17/30864 |
| | | | 707/707 |
| 2008/0147642 A1 | 6/2008 | Leffingwell et al. | |
| 2008/0154873 A1* | 6/2008 | Redlich | G06F 17/30395 |
| | | | 707/707 |
| 2008/0168135 A1* | 7/2008 | Redlich | G06Q 10/10 |
| | | | 709/204 |
| 2008/0201277 A1 | 8/2008 | Ozdemir et al. | |
| 2009/0018996 A1* | 1/2009 | Hunt | G06Q 30/02 |
| | | | 707/707 |
| 2009/0089078 A1* | 4/2009 | Bursey | H04W 4/70 |
| | | | 705/300 |
| 2009/0106234 A1* | 4/2009 | Siedlecki | G06F 17/30864 |
| | | | 707/707 |
| 2009/0282066 A1 | 11/2009 | Russell et al. | |
| 2010/0049766 A1* | 2/2010 | Sweeney | G06F 17/30705 |
| | | | 707/737 |
| 2010/0145917 A1* | 6/2010 | Bone | G06F 17/30082 |
| | | | 707/694 |
| 2010/0179951 A1 | 7/2010 | McPhail et al. | |
| 2010/0250547 A1 | 9/2010 | Grefenstette et al. | |
| 2010/0268700 A1 | 10/2010 | Wissner et al. | |
| 2010/0332454 A1 | 12/2010 | Prahlad et al. | |
| 2010/0332475 A1 | 12/2010 | Birdwell et al. | |
| 2011/0153686 A1* | 6/2011 | Campbell | G06Q 30/02 |
| | | | 707/812 |
| 2012/0041979 A1 | 2/2012 | Lee | |
| 2012/0096041 A1* | 4/2012 | Rao | G06F 17/30867 |
| | | | 707/794 |
| 2012/0131139 A1* | 5/2012 | Siripurapu | G06F 16/951 |
| | | | 709/217 |
| 2012/0173506 A1 | 7/2012 | Wilansky et al. | |
| 2012/0209847 A1* | 8/2012 | Rangan | G06F 16/3347 |
| | | | 707/737 |
| 2012/0214159 A1 | 8/2012 | George | |
| 2012/0254134 A1 | 10/2012 | Talati et al. | |
| 2012/0323941 A1 | 12/2012 | Chkodrov et al. | |
| 2013/0024424 A1 | 1/2013 | Prahlad | |
| 2013/0066921 A1 | 3/2013 | Mark | |
| 2013/0073400 A1 | 3/2013 | Heath | |
| 2013/0159310 A1* | 6/2013 | Birdwell | G06K 9/6224 |
| | | | 707/737 |
| 2013/0204886 A1 | 8/2013 | Faith et al. | |
| 2013/0218893 A1 | 8/2013 | Pai et al. | |
| 2014/0089777 A1* | 3/2014 | Roiniotis | G06Q 50/01 |
| | | | 715/234 |
| 2014/0279770 A1* | 9/2014 | Xaypanya | G06N 3/08 |
| | | | 706/15 |
| 2014/0280193 A1 | 9/2014 | Cronin et al. | |
| 2014/0358926 A1* | 12/2014 | McGregor | G16H 10/60 |
| | | | 707/737 |
| 2015/0019559 A1 | 1/2015 | Maquaire et al. | |
| 2015/0052158 A1 | 2/2015 | Bishop et al. | |
| 2015/0052162 A1 | 2/2015 | Arnold et al. | |
| 2015/0095340 A1 | 4/2015 | Bishop et al. | |
| 2015/0149491 A1* | 5/2015 | Redlich | G06Q 10/10 |
| | | | 707/755 |
| 2015/0278286 A1 | 10/2015 | Arnold et al. | |
| 2017/0092292 A1 | 3/2017 | Watts | |
| 2017/0235848 A1* | 8/2017 | Van Dusen | H04L 41/04 |
| | | | 705/12 |
| 2018/0083779 A1* | 3/2018 | Malone | G06F 17/30038 |
| | | | 707/707 |

FOREIGN PATENT DOCUMENTS

| | | |
|---|---|---|
| CN | 102955848 | 3/2013 |
| CN | 102968495 | 3/2013 |
| EP | 2474935 | 7/2012 |
| GB | 2338324 | 12/1999 |
| WO | 03065179 | 8/2003 |
| WO | 2005038689 | 4/2005 |

OTHER PUBLICATIONS

Taiwan Search Report dated Aug. 19, 2016, 1 page.
EMC Corp., EMC Captiva: Intelligent Enterprise Capture, http://web.emc.com/emc-captiva-capture?cmp=knc-IIG_Divisional-Captiva-DocIndex-INT&activity_id=218623&division=iig, accessed Aug. 7, 2013, 1 page.

(56) References Cited

OTHER PUBLICATIONS

StoredIQ, IQ Platform, http://www.storediq.com/applications/platform, accessed Aug. 9, 2013, 4 pages.
PCT International Search Report and Written Opinion, PCT/CN2014/084172, Nov. 15, 2014, 12 pages.
PCT International Search Report and Written Opinion, PCT/CN2014/084211, Nov. 18, 2014, 11 pages.

* cited by examiner

Run Action Confirmation

Your selected Action is now being queued to run on your current Infoset.

Go to the Execution Log tab in the details section to view the progress of this Action.

| Cancel | | Run and View | Run |

FIG.11

INCREMENTALLY RETRIEVING DATA FOR OBJECTS TO PROVIDE A DESIRED LEVEL OF DETAIL

CROSS-REFERENCE TO RELATED APPLICATIONS

This application is a continuation of U.S. patent application Ser. No. 14/228,925, entitled "INCREMENTALLY RETRIEVING DATA FOR OBJECTS TO PROVIDE A DESIRED LEVEL OF DETAIL", filed on Mar. 28, 2014; claims the benefit of U.S. Provisional Patent Application No. 61/866,258, filed on Aug. 15, 2013; and claims the benefit of U.S. Provisional Patent Application No. 61/866,202, filed on Aug. 15, 2013; each of which is herein incorporated by reference in its entirety.

BACKGROUND

1. Technical Field

Present invention embodiments relate to data management, and more specifically, to incrementally retrieving data for one or more objects managed within a data repository in order to provide the objects with a desired level of detail for performing a corresponding task.

2. Discussion of the Related Art

Legal documents and documents containing answers to Attorney questions are example market segments for which many businesses need data mining and control assistance. Since the volume of digital data that companies generate is growing at a significant rate (e.g., 60%-120%) annually, there is tremendous pressure on Information Technology (IT) executives and personnel to control costs associated with managing the data. The desired cost goals may be achieved with an understanding of the types of data being managed, the data needing to be preserved, and the data that can safely and permanently be deleted.

In order to efficiently access the data and information about the data (or metadata), operations and analysis may occur with respect to a specified portion of the total data. However, the data within the specified portion may be insufficient for the operations and analysis. A simple approach is to process and analyze all data to the fullest extent possible. Unfortunately, this approach is not a viable solution due to the vast amount of data being processed.

SUMMARY

According to one embodiment of the present invention, a computer-implemented method is provided, for retrieving data and metadata according to a data harvesting criteria into an indexed repository, comprising providing a user interface allowing a user to define data harvesting criteria for adjusting a subset of data and metadata on an indexed repository. Responsive to a user utilizing the user interface by defining the data harvesting criteria, the subset of data and metadata on the indexed repository is adjusted according to the data harvesting criteria.

BRIEF DESCRIPTION OF THE SEVERAL VIEWS OF THE DRAWINGS

Generally, like reference numerals in the various figures are utilized to designate like components.

FIG. 11 is a schematic illustration of an example dialog box confirming a selected action according to an embodiment of the present invention.

DETAILED DESCRIPTION

Figure 1:
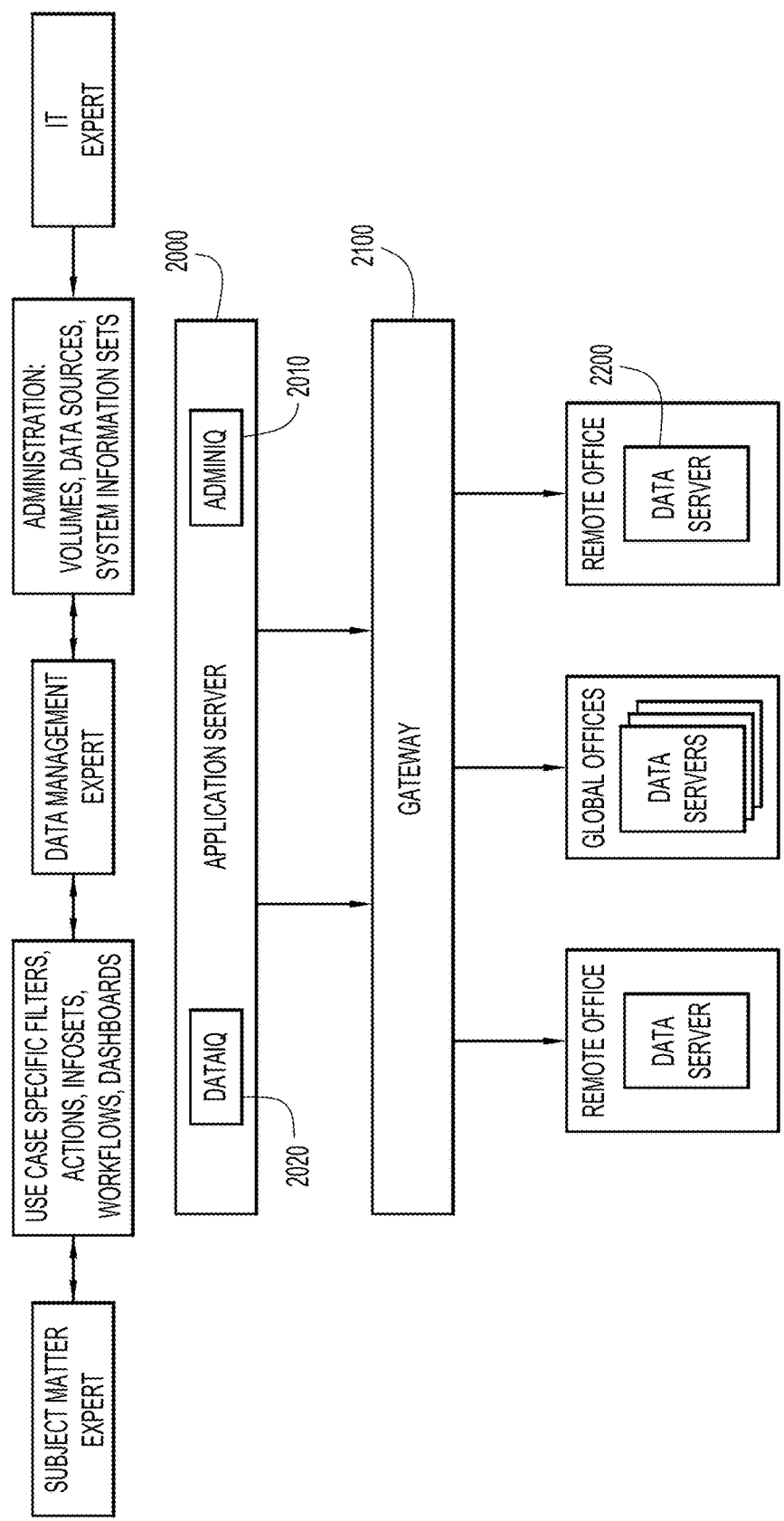
FIG. 1 is a diagrammatic illustration of an example computing environment of an embodiment of the present invention.
Figure 2:
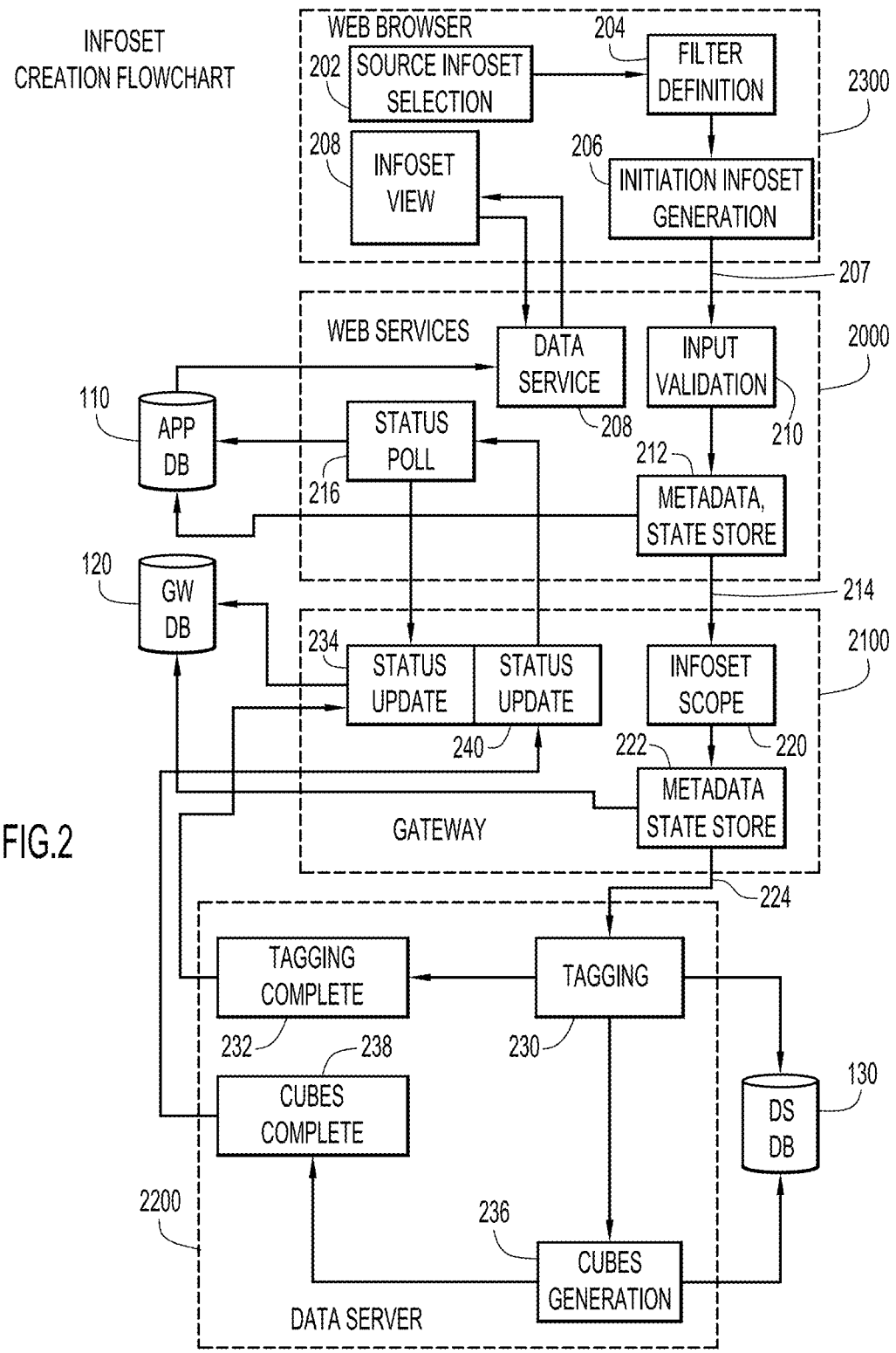
FIG. 2 is a flow diagram of an example manner of creating an information set according to an embodiment of the present invention.
Figure 3:
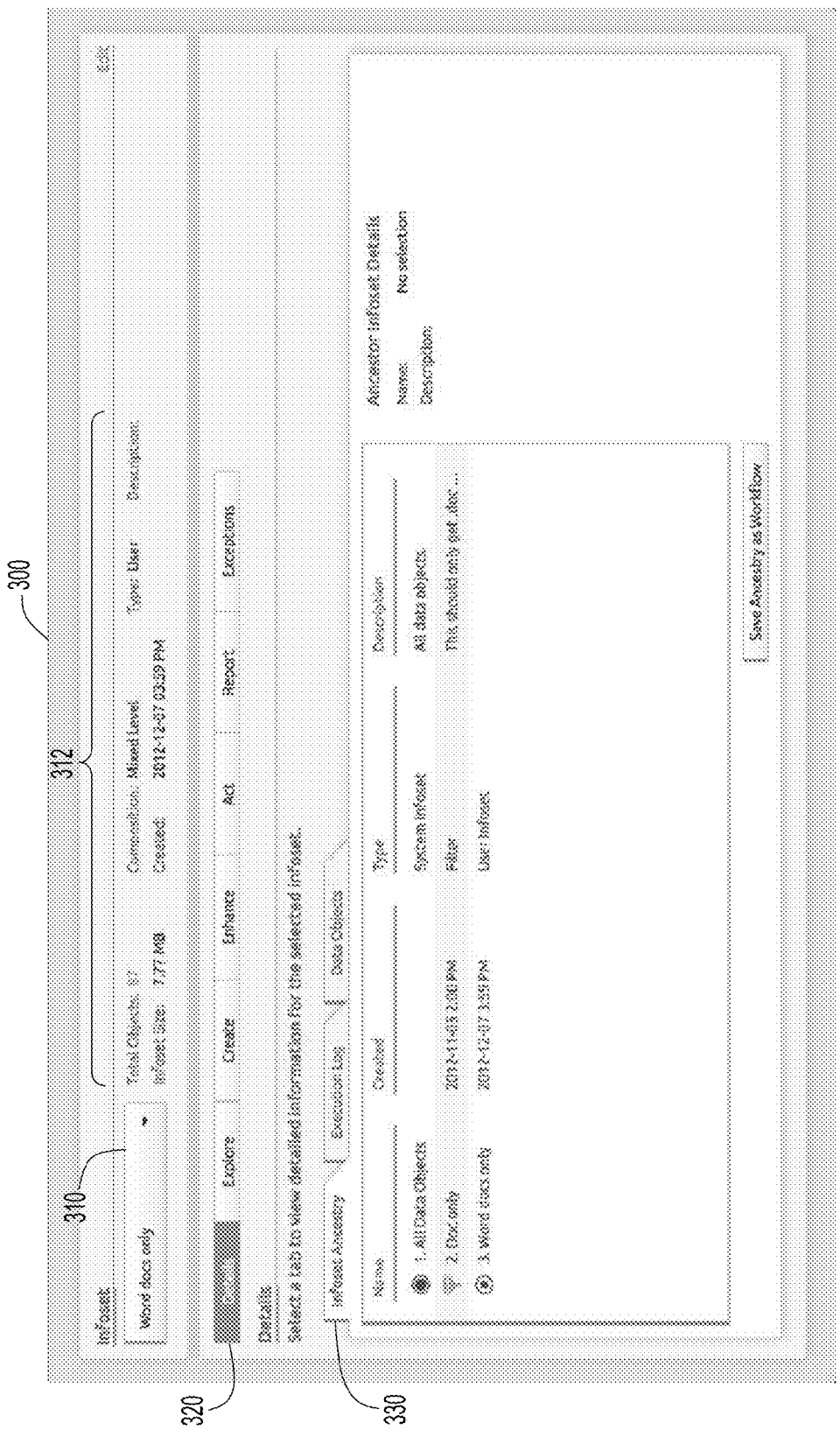
FIG. 3 is a schematic illustration of an example graphical user interface screen for selecting a source information set according to an embodiment of the present invention.
Figure 4:
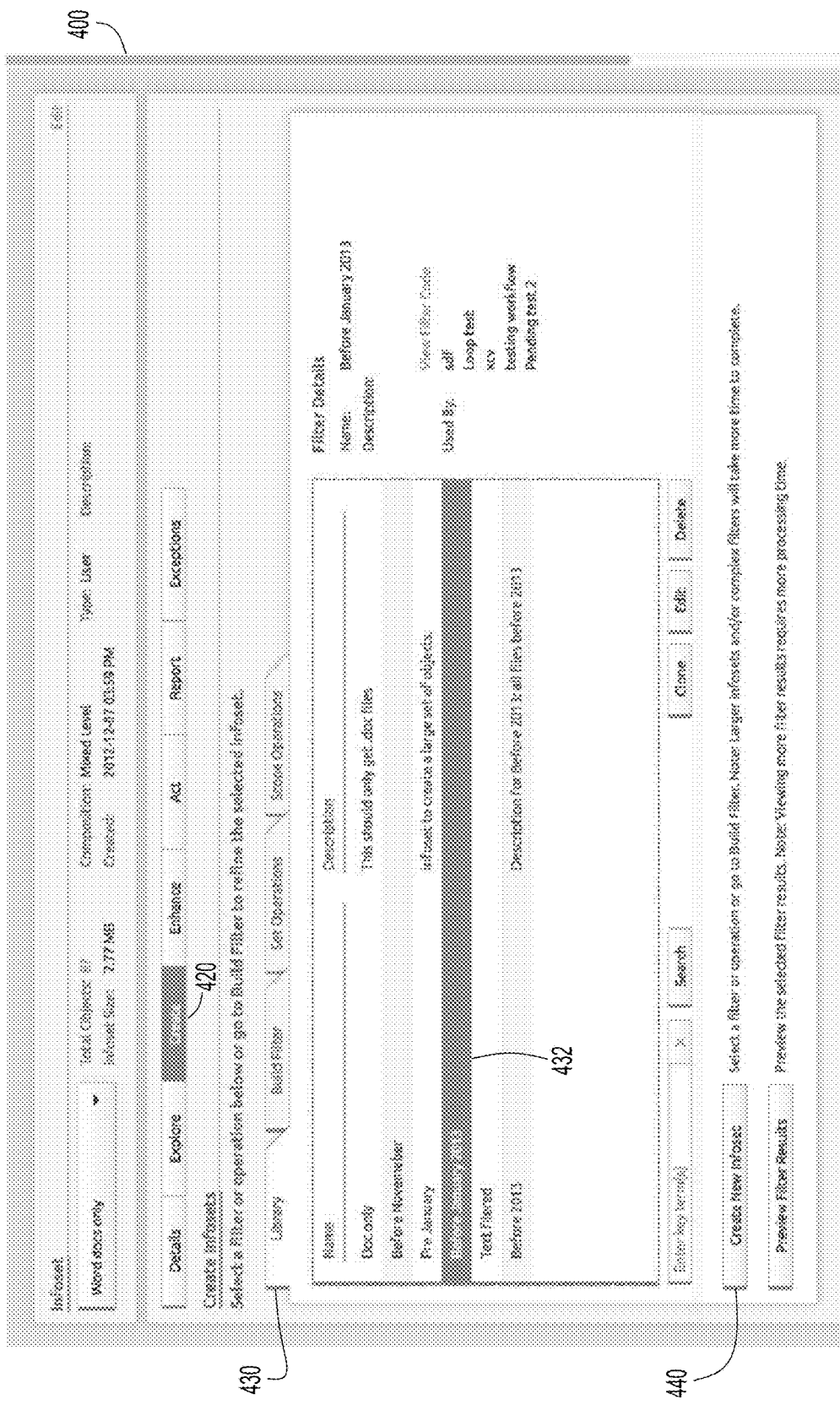
FIG. 4 is a schematic illustration of an example graphical user interface screen for selecting a filter for creating an information set from a source information set according to an embodiment of the present invention.
Figure 5:
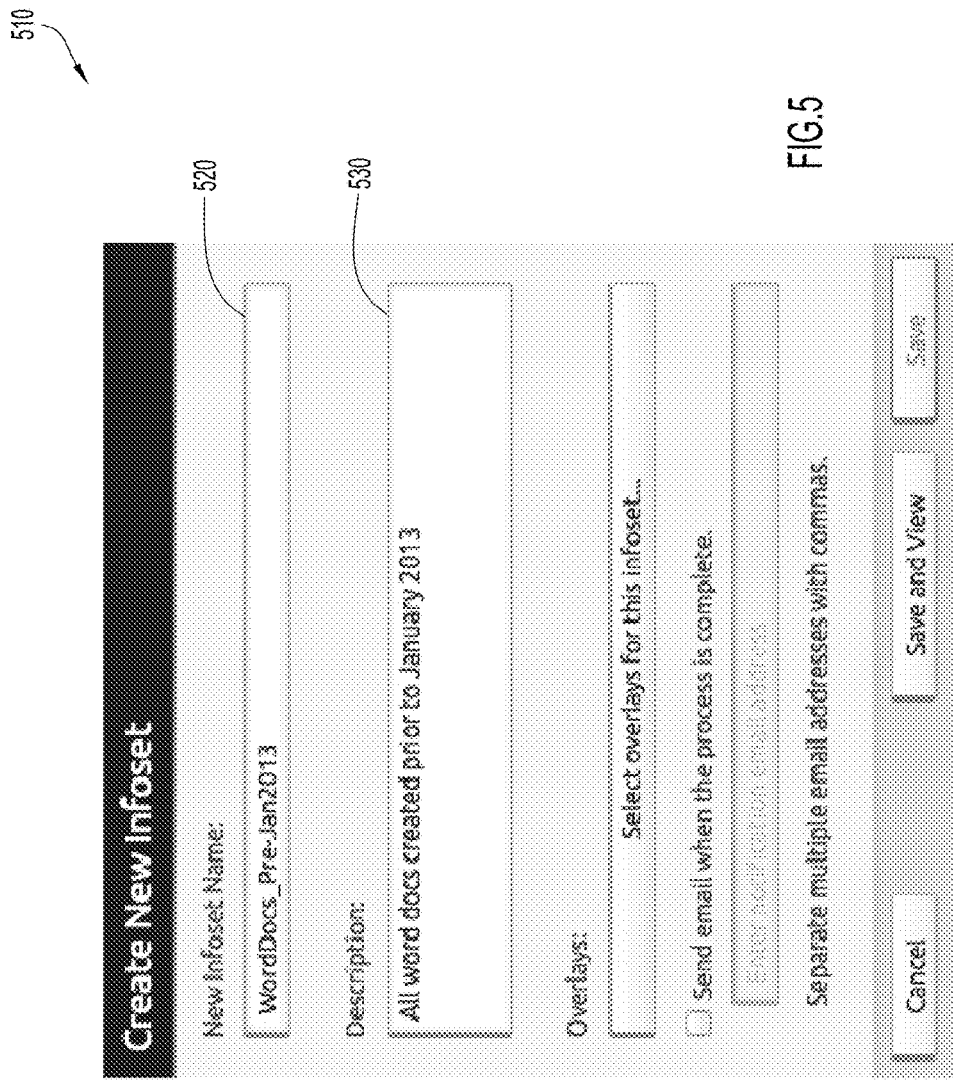
FIG. 5 is a schematic illustration of an example graphical user interface screen for entering a name and other metadata for an information set according to an embodiment of the present invention.

Present invention embodiments pertain to management of data within various data repositories, while allowing the data to be left intact on those repositories. Information about the data (or metadata) is extracted and inserted into an index stored separately from the data of the data repositories.

Present invention embodiments include a framework for retrieving information and metadata from the data repositories. The individual data repositories are accessed via adaptors with authentication to retrieve and, in certain instances, change the data. A user may provide their own rules for defining an information set (or subset of the managed data) to include information of interest to the user, and indicate a reference to the defined information set, thereby allowing for access rules across different access methods and different repositories. For example, a user may be interested in data stored in a UNIX file system and a WINDOWS file system. The user may name and save an information set with the desired resulting data in order to later access that data.

The data within an information set is established by applying filters to the managed data that are based on collected information. This collected information provides a level of understanding that enables Information Technology (IT) and knowledge professionals to identify data that is specific to or interesting for a use case. However, the data within an information set may need to be further analyzed or investigated. The information required by this analysis or investigation can vary on a case by case basis, but the system has to make sure that the information is available when needed.

Present invention embodiments further enable collection of the exact amount of data for making decisions or performing tasks without having to understand the details regarding the underlying specific placement of data and methods to access the data. In particular, present invention embodiments may build upon the information set feature. When a user finds that the information necessary for a deeper analysis is not available (in the information set), a data expansion or step-up operation is performed to collect (no less and no more than) the required data for the unavailable or missing information.

Present invention embodiments can ensure efficiency, where costly or time-consuming operations are only performed when necessary and only to a specified subset of the total data under management. For example, Information Technology (IT) personnel may start by harvesting only system metadata from file, email, collaboration, or other servers. The harvested information may be enough for a knowledge worker for a first scan to identify interesting data and to place this data into one or more information sets. The knowledge worker decides to perform a deeper analysis on the information set, but the data management system warns the knowledge worker that this analysis requires additional data (e.g., fulltext data) to be collected for the member objects of the information set. The knowledge worker and the IT professional work together to execute a data expansion or step-up operation that harvests and indexes the text content of the member objects. The referenced objects in the data management system are updated to include the additional information. The deeper analysis of the information set may proceed when the required information content becomes available.

There are numerous applications for this type of operation, including: container expansion; full text content caching; full text indexing; content-based attribute collection; and document classification assisted by machine-learning technologies.

The data in a data expansion operation may be associated with the information set or with the individual objects within the information set. In the case of the former, the data is "private" to the information set. In the case of the latter, the data is considered "public", and would be available for other information sets that share members with the information set for which this data was collected or generated.

Present invention embodiments provide several advantages including: maintaining important information in the data management system; accessing only the information important to a user; and the user accessing this data through definitions meaningful to the user without needing to know how and where the underlying data is kept.

An example environment for use with present invention embodiments is illustrated in FIG. 1. The environment provides data management for data that remains intact within data repositories. Specifically, the environment includes an application server system (or application stack) 2000, a gateway system 2100, one or more data server systems 2200, and one or more client or end-user systems to enable users and/or administrators to access the various data management services. The application server system, gateway system, data server systems, and client systems may be remote from each other and communicate over a network. The network may be implemented by any number of any suitable communications media (e.g., wide area network (WAN), local area network (LAN), Internet, Intranet, etc.). Alternatively, these systems may be local to each other, and communicate via any appropriate local communication medium (e.g., local area network (LAN), hardwire, wireless link, Intranet, etc.).

The application server system (or application stack) provides the backbone for a browser-based graphical user interface (GUI), and holds and provides information (e.g., metadata, state information, etc.) about application objects. The application server includes an administration component 2010 and a data component 2020. The administration component provides various administration tasks (e.g., configuration of volumes, data sources, system information sets, use case specific filters, actions, information sets, workflows, dashboards, etc.). These tasks may be performed by various users (e.g., Information Technology (IT), data management, and subject matter experts, etc.). The data component provides data management tasks for end-users (e.g., creation of information sets, performance of data expansion, etc.).

Gateway system 2100 serves as a gateway between application server system (or application stack) 2000 and data server systems 2200, and relays commands from the application server system to the data server systems. The data server systems register with and connect to the gateway system, where the gateway system maintains up-to-date information about the registered and connected data server systems. The gateway system further holds additional, and in some cases, more detailed metadata and status information about application-level objects, and also maintains certain types of data that are aggregated from the data server systems.

One or more data server systems 2200 may reside at various local or remote locations (e.g., remote offices, global offices, etc.) to access data of a customer or consumer of the data management services. The data server systems may be scaled out horizontally to meet processing needs. The data server systems have connectors to many types of customer or consumer data sources where their data resides. These connectors have the ability to interrogate, to harvest and, in certain cases, to modify the content of the data sources. Further, each data server system maintains one or more indexes for whatever it has collected from the customer data servers that were assigned to the data server systems. The data server systems perform the bulk of data processing and computation in terms of collecting data, executing actions, performing searches, and deeper data analysis. Thus, the data server systems provide access to customer or consumer data to enable management of that data while the customer data remains intact within the customer data repositories or server systems.

Application server system 2000, gateway system 2100, data server systems 2200 and the client systems may be implemented by any conventional or other computer systems preferably equipped with a display or monitor, a base (e.g., including at least one processor, one or more memories and/or internal or external network interfaces or communications devices (e.g., modem, network cards, etc.)), optional input devices (e.g., a keyboard, mouse or other input device), and any commercially available and custom software (e.g., server/communications software, data and administration components, browser/interface software, etc.). These systems may include one or more modules or units to perform the various functions of present invention embodiments described below. The various modules may be implemented by any combination of any quantity of software and/or hardware modules or units, and may reside within memory of the application server, gateway, data server and/or client systems for execution by a system processor.

Information sets provide a virtual data "container" for data that has been indexed by data server systems 2200. For example, an information set may have the form of a list of references or handles to records included in the index. An information set may represent some or all of that data, and may be immutable. A user may derive a new information set from another information set based on specific selection criteria to filter the other information set's content. Information sets may be used, and reused, to perform a wide variety of operations against that data (e.g., copying the data, deleting the data, etc.). As the underlying indexes are updated or recreated, new information sets may be created to reflect those changes. Thus, information sets may provide "snapshots" of user's data in time.

A user interface (UI) may allow a user to define rules for criteria (e.g., specifying an identity, department, organization, vendor, product, custodian, object properties, attributes, etc.) to encapsulate indexed data, create an information set of the indexed data meeting the criteria, adjust the criteria to form a new information set, perform set operations (e.g., comparison, identifying changes, union, intersection, complement, symmetric difference, etc.) on information sets, present reports of the results of the operations, and convert the criteria to adaptors with filters to retrieve the data satisfying the criteria.

Information sets are created by applying the user defined criteria into a search expression for the entire index or at least a subset of the index, and tagging each object meeting the criteria with an information set identification. In addition, a list of objects meeting the criteria may be persisted. Subsequent usage provides quick access to the data through the previously stored list. In other words, an information set may be thought of as a table of references to the objects in the index. In one embodiment, each object in an index has an object id and the information set table has a list of object ids. The object id could be monotonically assigned integers, an initial allocation pointer, or any other way of providing a unique identification.

A manner of creating an information set from a source information set according to an embodiment of the present invention is illustrated in FIGS. 2-5. Initially, at step 202, a user selects a source information set via a browser-based graphical user interface screen 300 (FIG. 3) provided by a web browser of a client system 2300. For example, user interface screen 300 may include drop-down list control 310 for selecting an information set by name. A user may generate a new information set from all data objects (e.g., by selecting the system information set of all data objects as the source information set), or create a new information set from a previously generated information set.

User interface screen 300 may further include summary information 312 (e.g., total number of objects in the information set, size of the information set in megabytes, data and time created, description, etc.), "Details" radio-button option 320 to enable a user to view details (e.g., ancestry, execution log, data objects) of the selected information set, and other information and/or controls. For example, the user may review ancestry 330 of an information set named "Word docs only" to see that the information set was created from a system-provided information set containing all data objects by selecting files with a ".doc", ".docx", or any other suitable extension indicating a Word document from that system-provided information set.

At step 204, the user selects a filter to further narrow down the content of the source information set. For example, the user may select the "Create" navigation bar option 420 of screen 400 (FIG. 4) to display a library 430 of existing filters and choose filter 432 for selecting files created before January, 2013. The user may choose to create a new information set using the selected source and filter by actuating the "Create New Infoset" button 440.

At step 206, the user names the new information set and initiates its generation. For example, the user may enter a name in text box 520 of dialog screen 510 (FIG. 5) and may enter other metadata for the information set, e.g., a description using text box 530. Generation of the information set is initiated when the user saves this information. In particular, the browser of client system 2300 communicates the user input defining the new data set to web services of application server system 2000 at step 207. At step 208, the user may monitor the progress towards generating the information set by selecting the new information set using screen 300 and periodically refreshing the screen to view, e.g., summary information 312, state information, history of events, actions available, etc.

At step 210, web services of application server 2000 validates the user input and reports any errors to the browser of client system 2300. The web services of application server 2000 stores metadata and state information in its database, application server database 110, at step 212. At step 214, the web services of application server 2000 instruct gateway 2100 to start creating the information set. Web services of application server 2000 also initiates status polling for the information set being created in order to learn about any change in the processing and final states at step 216.

At step 220, gateway 2100 determines the scope of the work to be performed. In particular, gateway 2100 determines which data servers 2200 will participate in performing the work. This may be determined using metadata of the source information set (e.g., where the source data resides) and state information of the data servers. At step 222, the gateway stores metadata of the new information set and prepares detailed state information for the participating data servers 2200 in its own database, gateway database 120. At step 224, the gateway instructs each participating data server to start the information set creation. The data servers may perform their assigned work concurrently and independently from each other.

At step 230, data servers 2200 tag objects that will belong to the new information set. In particular, the data servers generate and store in data server database 130 references to objects that are members of the source information set and that also satisfy the filter expression. The data servers determine membership based on information stored in their indexes. Thus, the data sources where the users' actual data reside are not accessed during the process of creating the new information set. The data servers may divide the membership generation into smaller tasks that can run in parallel for efficiency.

Data servers 2200 notify gateway 2100 at step 232 each time one of the smaller tagging tasks completes. The gateway receives these notifications at step 234. In response, the gateway updates the detailed state information of the new information set in gateway database 120. This updated state information is then sent to web services of application server 2000 when the web services requests an update at step 216.

Data servers 2200 generate and store aggregated information about the content of the new information set in data server database 130 at step 236. This information may be stored in, e.g., multidimensional data structures (referred to herein as a cube). The data servers may divide cube generation into smaller tasks that can run in parallel for efficiency. The data servers notify gateway 2100 each time when a smaller cube generation task is complete at step 238. The gateway receives these notifications at step 240 and updates the information set's detailed state information in gateway database 120. This updated state information is then sent to the web services of application server 2000 when the web services ask for an update at step 216.

The information set generation is considered complete when every smaller task on every participating data server is finished, and the state information is updated at the gateway and at the application server levels.

Figure 6:
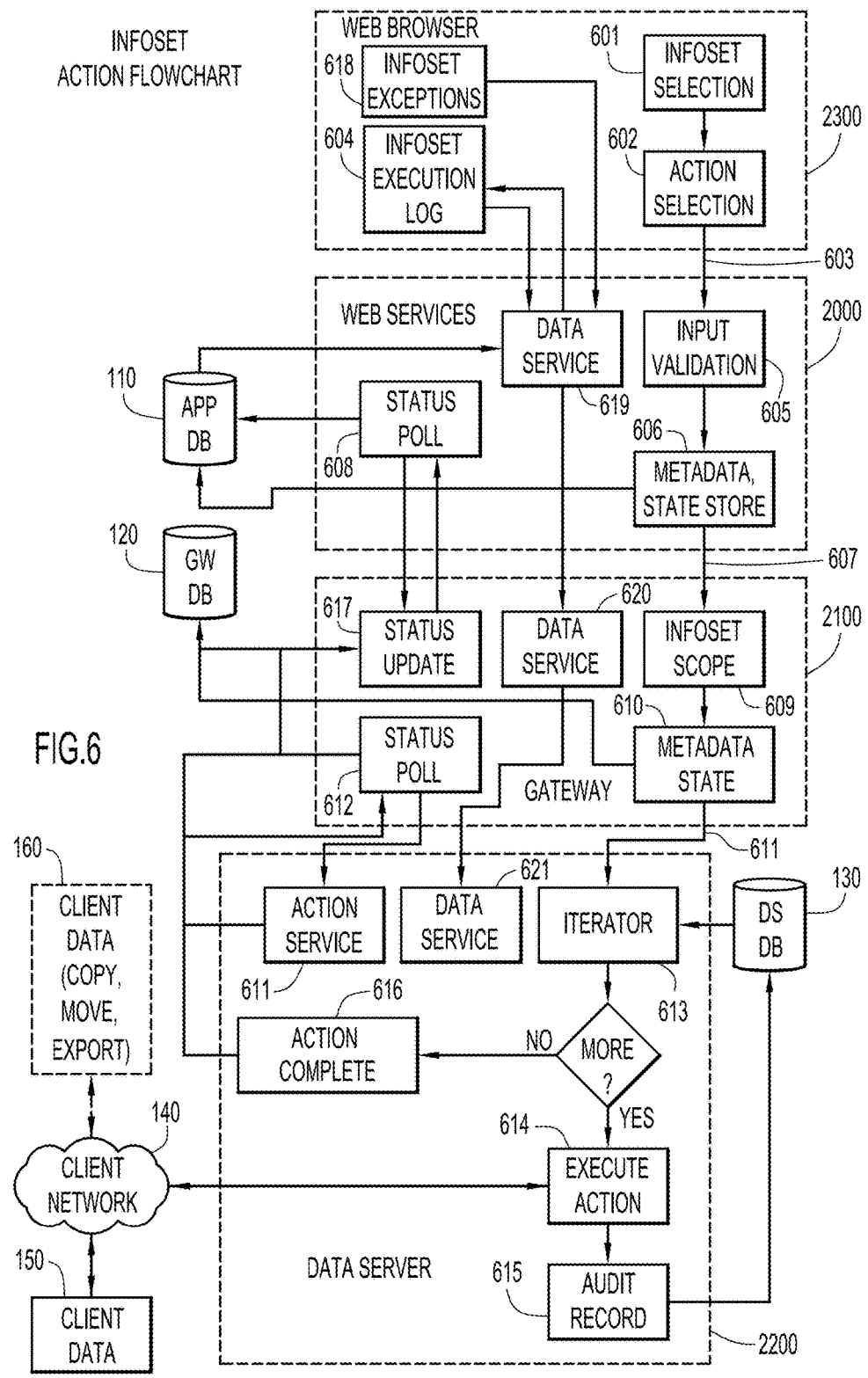
FIG. 6 is a flow diagram of an example manner of applying an operation against data designated by an information set according to an embodiment of the present invention.
Figure 7:
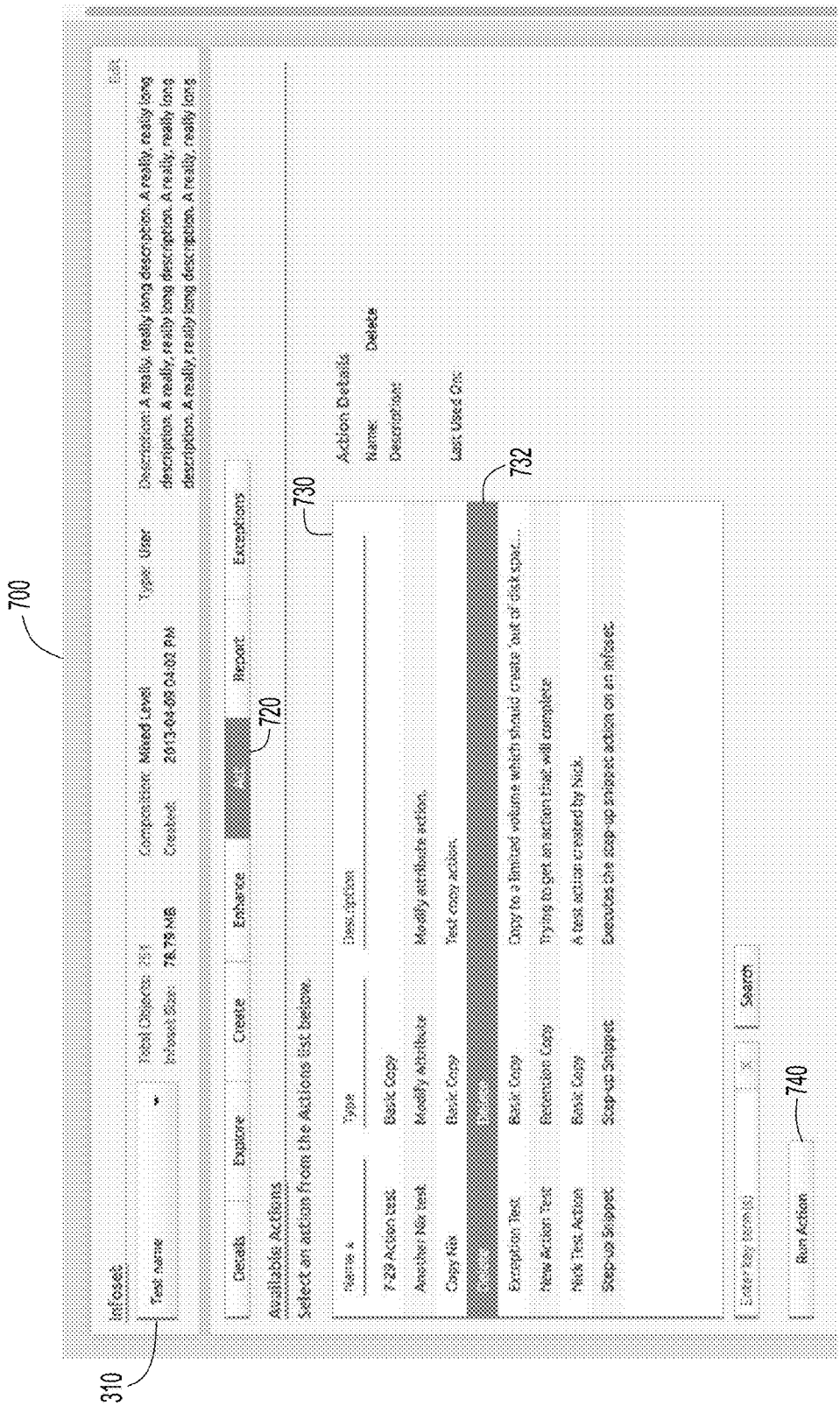
FIG. 7 is a schematic illustration of an example graphical user interface screen for selecting an operation to apply against data designated by an information set according to an embodiment of the present invention.
Figure 8:
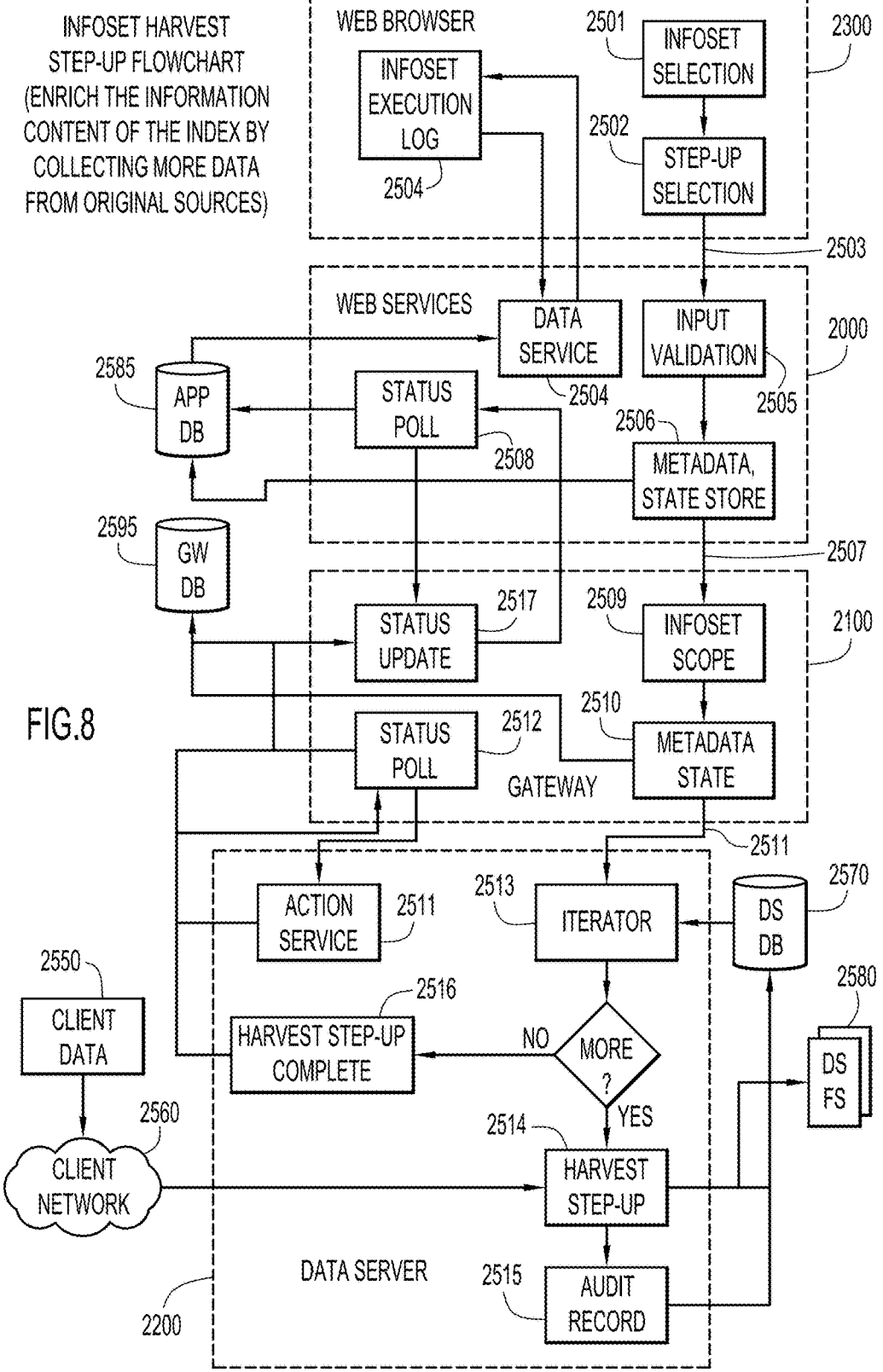
FIG. 8 is a flow diagram of a data expansion for an information set utilizing data sources according to an embodiment of the present invention.
Figure 9:
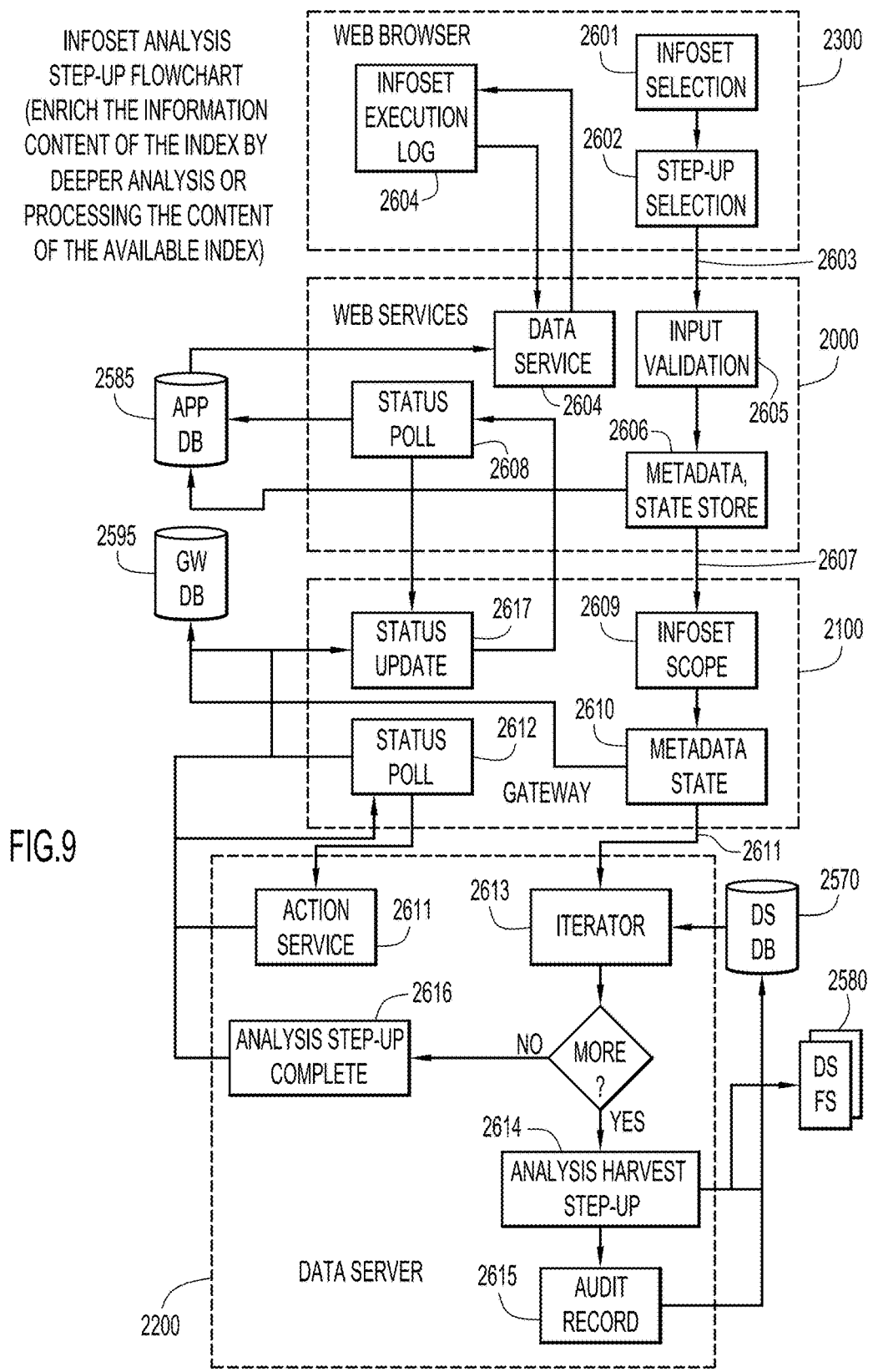
FIG. 9 is a flow diagram of a data expansion for an information set utilizing an index and previously retrieved data according to an embodiment of the present invention.
Figure 10:
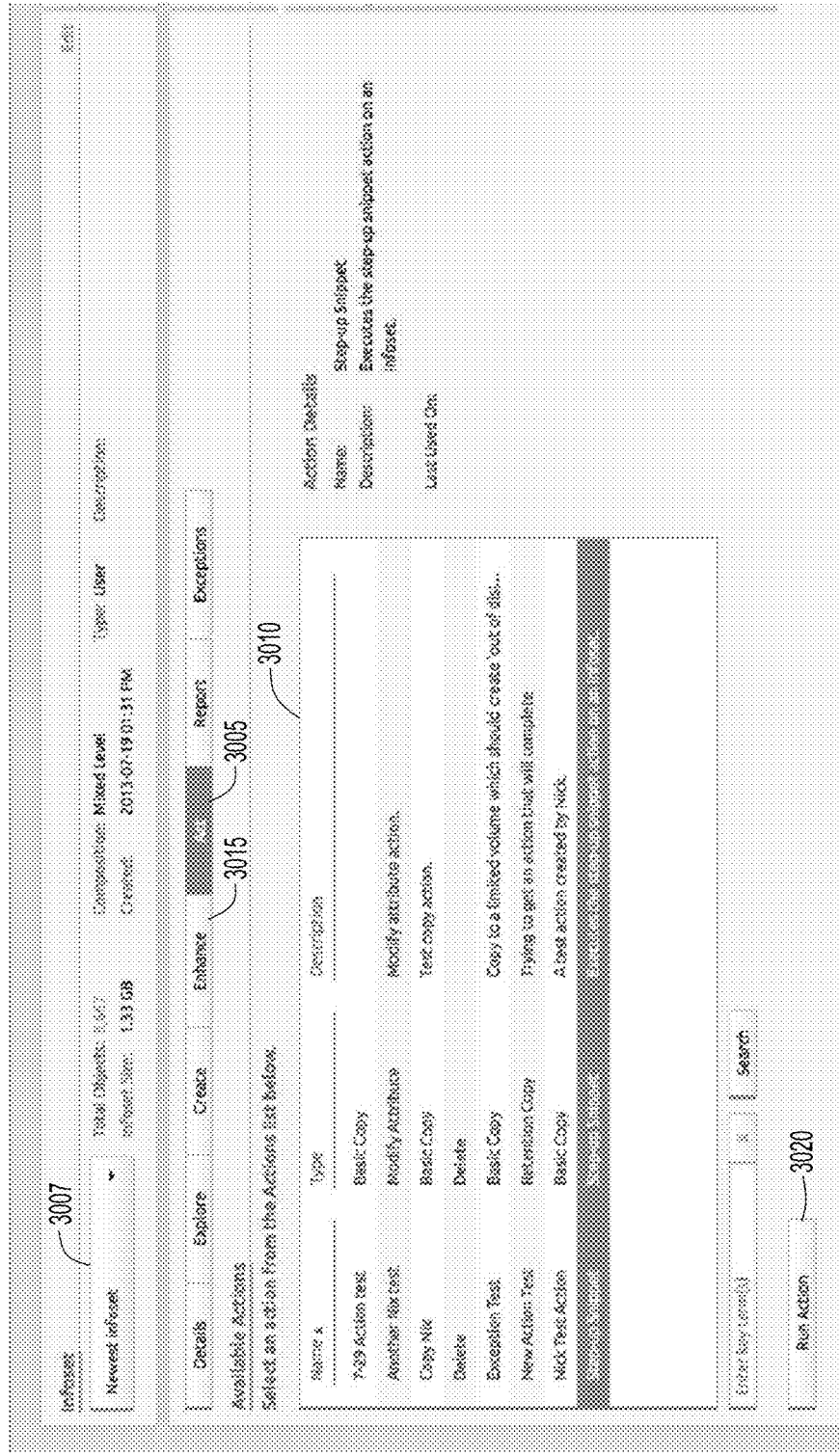
FIG. 10 is a schematic illustration of an example graphical user interface screen for initiating data expansion according to an embodiment of the present invention.
Figure 12:
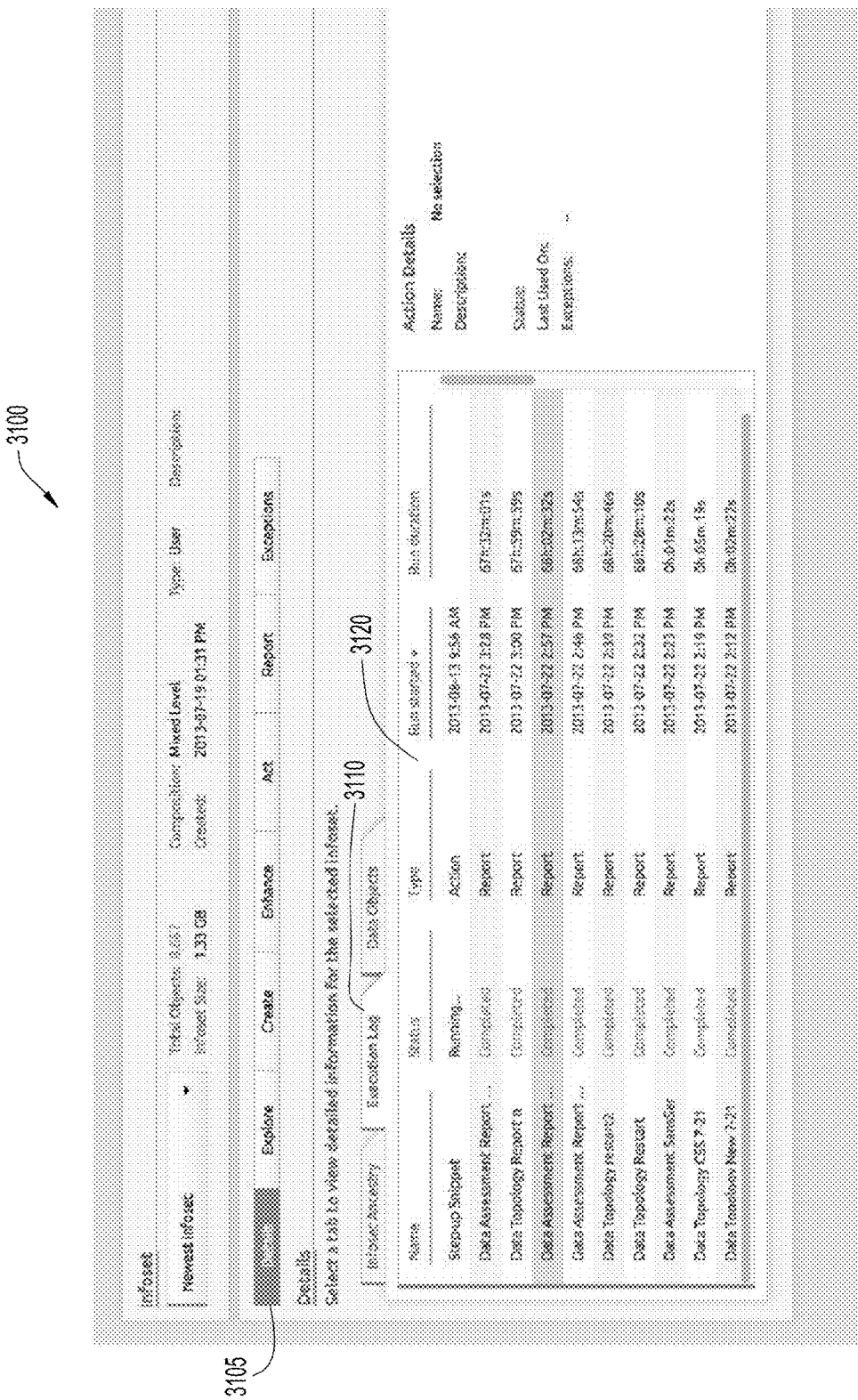
FIG. 12 is a schematic illustration of a graphical user interface screen presenting a status of a selected action according to an embodiment of the present invention.

A manner of applying an operation against data designated by an information set according to an embodiment of the present invention is illustrated in FIGS. 6 and 7. Initially, at step 601, a user selects an information set via a browser-based graphical user interface screen 700 (FIG. 7) provided by a web browser of a client system 2300. For example, user interface screen 700 may include drop-down list control 310 for selecting an information set by name. User interface screen 700 may further include "Act" navigation bar option 720 to present list box 730 of predefined actions to apply. At step 602, the user selects the desired action (e.g., delete, export, move, copy, etc.). For example, the user may select delete operation 732 from list box 730. Users may define custom actions, e.g., using an action creation/editing interface. At step 603, the user initiates the action by actuating "Run Action" button 740. In one embodiment, the user confirms his or her intention to execute the action in an additional step (e.g., in response to a pop-up dialog box). The user may monitor the state of the action at 604 by periodically refreshing a view of the execution log in the browser.

At step 605, web services of application server 2000 validate the user input, and report any errors to the web client of client system 2300. At step 606, web services of application server 2000 store metadata and brief state information in application server database 110. At step 607, web services of application server 2000 instruct gateway 2100 to start execution of the specified action. At step 608, web services of application server 2000 initiate status polling for the action being executed in order to learn when the action is completed.

At step 609, gateway 2100 determines the scope of the work by identifying the specific data servers of data servers 2200 that will actually have to do the work. Available membership information of the information set and state information of the data servers are used for this purpose. At step 610, the gateway stores metadata and state information about the action in its gateway database 120. At step 611, the gateway instructs each participating data server to start the execution of the action. The data servers may perform their assigned work concurrently and independently from each other. At step 612, the gateway also initiates a polling process in order to detect any fatal condition (e.g. power loss) at the data servers.

At step 613, the data servers create an iterator for the members of the specified information set by reading membership tags and additional parameters from its database, data server database 130. The iteration process receives parameters identifying an operation to be performed. When requesting a next item, items which already have the operation performed are by-passed and the next one needing the operation is returned. The data servers execute the specified action against each member object of the information set at step 614. Applying the actions requires the data servers to mount the servers on which the customer's data 150 resides (and/or should be transferred) via client network 140, and—based on the type of action—copy, delete, move, or export the affected objects at operation 160. The data servers may employ multiple processes to carry out the action on multiple objects simultaneously. The results of the action on member objects are written as audit records into data server database 130 at step 615. The data servers notify the gateway at step 616 when the processing of the final object of the information set is complete.

The gateway receives this notification and updates the action's state information in gateway database 120 at step 617. This updated state information is then fed to the web services of application server 2000 when the web services ask for an update at step 608.

The action is considered complete when every participating data server is finished (or has stopped responding), and the state information is updated at the gateway and at the web services levels.

The user can view the details of exceptions of selected types via an "Exceptions View" of the information set at step 618. Web services of application server 2000 ask the gateway to return the requested types of exceptions and details of the failed objects at step 619. At step 620, the gateway fetches the requested information. The gateway retrieves the requested information from its local gateway database 120 in case the information has already been cached there. Otherwise, the gateway asks the data servers that participated in the execution of that action to provide the information, in which case the participating data servers identify and return the requested exceptions and details based on the audit records in data server database 130, at step 621. The user may create a new information set for the selected objects of the requested exceptions. In this manner, the user could investigate these objects later, and/or reattempt the same operation again just for those objects in case the cause of the exception was transient.

A user may create an information set of data objects of interest as described above. The data server systems collect or harvest data from the customer data servers and generate an index for the collected data that is utilized for data management and creation of the information set. However, in order to conserve memory space, the index may include a limited amount of information (or be a shallow index). In certain instances, additional information may be needed for the data objects of the information set in order to perform analysis or other actions. Accordingly, embodiments of the present invention enable an incremental retrieval of additional information for the data objects until the desired level of detail is present for the information set to perform the analysis or other actions. The additional information may be retrieved in a harvest (e.g., accessing the customer data sources) or analysis (e.g., accessing the index and previously harvested data (without accessing the customer data servers)) type manner. The type of retrieval may be configured, controlled by a parameter, or specified by a user from a user interface.

A manner of incrementally retrieving additional information for an information set by accessing customer data servers is illustrated in FIGS. 8, and 10-12. Initially, a user selects at step 2501 an information set via a drop-down list 3007 of a browser-based graphical user interface screen 3000 (FIG. 10) provided by a web browser of a client system 2300. The user further selects the desired type of data expansion (e.g., a snippet (i.e. text content caching), fulltext indexing, etc.) from a list of available actions 3010 under an Act tab 3005 of interface screen 3000 at step 2502. The snippet data expansion provides an additional portion of content for a data object of the information set for later use, while full text data expansion retrieves and indexes the entire content. In addition, an attribute type data expansion may be employed to retrieve additional information for data object attributes.

The user executes the data expansion at step 2503 by actuating a run action actuator 3020 of interface screen 3000 after confirming the intention to execute on a dialog box with cancel, run, and run and view actuators (FIG. 11). The run actuator executes the data expansion while the run and view actuator further displays results.

The user can monitor the state of the action at step 2504 by periodically refreshing an execution log view 3120 of graphical user interface screen 3100 (FIG. 12) by actuating an Execution Log tab 3110 under a Details tab 3105. The refreshing is performed by a combination of the web browser of client system 2300 and web services of application server system 2000.

The web services of application server system 2000 validate the user input and report any error to the web client at step 2505. The web services of application server system 2000 further store metadata and brief state information in its database (App DB 2585) at step 2506, and instruct gateway system 2100 to start the execution of the specified data expansion at step 2507. The web services of application server system 2000 also initiate status polling for the data expansion being executed in order to learn when the data expansion is completed at step 2508.

Gateway system 2100 determines the scope of the work at step 2509 by identifying the specific data server systems 2200 that will actually have to do the work. Available membership information of the information set and the state of the data servers are used for this purpose. The gateway system stores metadata and state information about the data expansion in its database (GW DB 2595) at step 2510, and instructs each identified and participating data server system to start the execution of the data expansion at step 2511. The data server systems perform their assigned work concurrently and independently from each other. The gateway system further initiates a polling process in order to detect any fatal condition (e.g. power loss) at the data server systems at step 2512.

Data server systems 2200 create an iterator for the members of the specified information set by reading membership tags and additional parameters from its database (DS DB 2570) at step 2513. The iteration process receives parameters identifying an operation to be performed. When requesting a next item, items which already have the operation performed are by-passed and the next one needing the operation is returned.

On each member object of the information set, the data server systems execute the specified data expansion at step 2514. Harvest type data expansions require the data server systems to mount the data servers (e.g., via client network 2560) where the customer or consumer data 2550 resides. A harvester of the data server system collects the requested additional information about the objects of the information set. Typically, additional attributes are retrieved and added to the object (e.g., full text). The handling can be quite complex and utilize various techniques (e.g., artificial intelligence (AI) combined with natural language processing (NLP) may be utilized to classify the retrieved data). This operation can be supported by third party techniques, so that the third party controls access to their data and defines the meaning of the data and how to characterize, classify, and adjust the mined information. The third party may supply their executables (or executable computer programs), where the third party executables retrieve the information of the data to be stored in the data management system repository for the object.

The collected information is persisted into the database (DS DB 2570) or a file system (DS FS 2580). The data server systems can employ multiple processes to carry out the data expansion operation on plural objects simultaneously. The success/failure status of the data expansion operation on member objects of the information set is written into the database (DS DB 2570) as audit records at step 2515.

Data server systems 2200 notify gateway system 2100 when the harvesting of the final object of the information set is complete at step 2516. The gateway system receives this notification and updates the data expansion state information in its database (GW DB 2595) at step 2517. This updated state information is then fed to the web services of application server system 2000 when the web services request an update at step 2508.

The data expansion is considered complete when every participating data server system is finished (or stopped responding), and the state information is updated at the gateway and the web services levels.

A manner of incrementally retrieving additional information for an information set by accessing the index and previously harvested data is illustrated in FIGS. 9-12. An example of this type of step-up operation is content analysis. The index already has the necessary attributes, and the text content of the objects within the information set are fully indexed. A deeper analysis of the content may be performed by employing machine-learning techniques or by other manners. This analysis may provide additional information about the objects in terms of tags and attributes. These tags and attributes are stored in DS DB 2570, and may be available for users to see and to use as filter conditions for future information sets. Content analysis is one of the most expensive operations, so it is important that customers perform this analysis on exactly the type and amount of data (i.e., information set) required.

Initially, a user selects at step 2601 an information set via a drop-down list 3007 of a browser-based graphical user interface screen 3000 (FIG. 10) provided by a web browser of a client system 2300. The user further selects the desired type of data expansion (e.g., auto-classification of analysis based on machine-learning techniques) from a list of available actions under an Enhance tab 3015 of interface screen 3000 at step 2602.

The user executes the data expansion at step 2603 by actuating a run action actuator 3020 of interface screen 3000 after confirming the intention to execute on a dialog box with cancel, run, and run and view actuators (FIG. 11). The run actuator executes the data expansion while the run and view actuator further displays results.

The user can monitor the state of the action at step 2604 by periodically refreshing the execution log view 3120 of graphical user interface screen 3100 (FIG. 12) by actuating an Execution Log tab 3110 under a Details tab 3105. The refreshing is performed by a combination of the web browser of client system 2300 and web services of application server system 2000.

The web services of application server system 2000 validate the user input and report any error to the web client at step 2605. The web services of application server system 2000 further store metadata and brief state information in its database (App DB 2585) at step 2606, and instruct gateway system 2100 to start the execution of the specified data expansion at step 2607. The web services of application server system 2000 also initiate status polling for the data expansion being executed in order to learn when the data expansion is completed at step 2608.

Gateway system 2100 determines the scope of the work at step 2609 by identifying the specific data server systems 2200 that will actually have to do the work. Available membership information of the information set is used for this purpose. The gateway system stores metadata and state information about the data expansion in its database (GW DB 2595) at step 2610, and instructs each identified and participating data server system to start the execution of the data expansion at step 2611. The data server systems perform their assigned work concurrently and independently from each other. The gateway system further initiates a polling process in order to detect any fatal condition (e.g. power loss) at the data server systems at step 2612.

Data server systems 2200 create an iterator for the members of the specified information set by reading membership tags and additional parameters from its database (DS DB 2570) at step 2613. The iteration process receives parameters identifying an operation to be performed. When requesting a next item, items which already have the operation performed are by-passed and the next one needing the operation is returned.

On each member object of the information set, the data server systems execute the specified data expansion at step 2614. Analysis type data expansions work only on the previously harvested and indexed data. The customer's data sources are not involved or accessed at all. The deeper analysis results in additional information about the objects of the information set. Typically, additional attributes are retrieved and added to the object (e.g., full text). The handling can be quite complex and utilize various techniques (e.g., artificial intelligence (AI) combined with natural language processing (NLP) may be utilized to classify the retrieved data).

The collected information is persisted into the database (DS DB 2570) or a file system (DS FS 2580). The data server systems can employ multiple processes to carry out the data expansion operation on plural objects simultaneously. The success/failure status of the data expansion operation on member objects of the information set is written into the database (DS DB 2570) as audit records at step 2615.

Data server systems 2200 notify gateway system 2100 when the harvesting of the final object of the information set is complete at step 2616. The gateway system receives this notification and updates the data expansion state information in its database (GW DB 2595) at step 2617. This updated state information is then fed to the web services of application server system 2000 when the web services request an update at step 2608.

The data expansion is considered complete when every participating data server system is finished (or stopped responding), and the state information is updated at the gateway and the web services levels.

The data expansion operation updates the data repository storing metadata and the data retrieved and indexed. The data expansion operation could also remove information that is no longer needed. Thus, when an object has been expanded, new information sets in which the object is placed get the benefit of the additional information. In other words, the new information sets include the object with the additional information. In addition, one or more data expansion or step-up operations may be performed on an information set to incrementally retrieve additional information for the objects (e.g., snippet, full text, and attribute or any combinations thereof). In this fashion, the information set may be incrementally updated with additional information until a desired level of detail is attained for an analysis or other actions.

It will be appreciated that the embodiments described above and illustrated in the drawings represent only a few of the many ways of implementing embodiments for incrementally retrieving data for objects to provide a desired level of detail.

The environment of the present invention embodiments may include any number of computer or other processing systems (e.g., client or end-user systems, gateway systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, data and administration components, etc.). These systems may include any types of monitors and input devices (e.g., keyboard, mouse, voice recognition, etc.) to enter and/or view information.

It is to be understood that the software (e.g., software to create information sets, software to perform data and metadata adjustment or expansion, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., software to create information sets, software to perform data and metadata adjustment or expansion, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., information sets, adjusted or expanded data and metadata, etc.). The database system may be implemented by any number of any conventional or other databases, data stores or storage structures (e.g., files, databases, data structures, data or other repositories, etc.) to store information (e.g., information sets, adjusted or expanded data and metadata, etc.). The database system may be included within or coupled to the server, gateway, and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., obtaining criteria, displaying adjusted or expanded data and metadata, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, or other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of the present invention may be characterized by a method, system, and computer program product for retrieving data and metadata according to a data harvesting criteria into an indexed repository. A user interface allows a user to define data harvesting criteria for adjusting a subset of data and metadata on an indexed repository. Responsive to a user utilizing the user interface by defining the data harvesting criteria, the subset of data and metadata on the indexed repository is adjusted according to the data harvesting criteria.

Support may further be provided to manage an increasing complex subset of data based on the data harvesting criteria, and efficient management of the harvested data is facilitated. Further, natural language processing and artificial intelligence may be utilized to classify data and to refine the data harvesting criteria. In addition, a characterization may be converted to adaptors with filters to retrieve the data according to a user request.

The data harvesting criteria may support a specification selected from a group consisting of per object, per information set, metadata, container, full text, member sets, caching, attribute, classification, files, email, and servers. Further, the data harvesting criteria may be applied to filters to access data. Moreover, the data may be maintained on repositories each with its own access interface.

What is claimed is:
1. A computer-implemented method comprising:
at a processor of a computing device, generating an information set that includes a limited amount of information based on a repository index, wherein the repository index includes information about an indexed repository that includes one or more data server systems;
receiving data harvesting criteria for a data expansion operation to be performed for the information set on the indexed repository;
determining data server systems of the indexed repository to participate in the data expansion operation, wherein each of the data server systems has its own access interface;
causing each participating data server system to execute the data expansion operation against data and metadata on that particular data server system according to the data harvesting criteria while allowing the data and metadata to be left intact on that particular data server system, wherein the data harvesting criteria are refined by utilizing natural language processing and artificial intelligence to classify the data and metadata on each particular data server system:
converting a characterization included in the data harvesting criteria to adaptors with filters to retrieve the data and metadata on each particular data server system according to a user request;
transforming the repository index for the indexed repository to include additional information from the data expansion operation, wherein the transforming adds the additional information to the information set to incre- mentally update the limited amount of information included in the information set until a desired level of detail is attained, wherein the updating ensures that subsequently generated information sets created based on the data and metadata subject to the data expansion operation include the additional information wherein the additional information comprises a plurality of subsets, and wherein transforming the repository index comprises:

training a classifier to learn one or more classifications based on machine learning techniques, classifying each of the subsets into one or more learned classifications during the data expansion operation via the trained classifier, and determining inclusion of each subset in the desired level of detail according to the classification of the subset by the trained classifier.

2. The computer-implemented method of claim 1, wherein the data harvesting criteria supports a specification selected from a group consisting of per object, per information set, metadata, container, full text, member sets, caching, attribute, classification, files, email, and servers.

3. The computer-implemented method of claim 1, further comprising:

providing support to manage subsets of the data and metadata on each particular data server system when subsets are formed based on new data harvesting criteria.

4. The computer-implemented method of claim 1, wherein the data harvesting criteria is applied to filters to access the data and metadata on each particular data server system.

5. The computer-implemented method of claim 1, wherein incrementally updating the limited amount of information included in the information set until a desired level of detail is attained includes:

excluding information beyond the desired level of detail to reduce a processing time of the processor.

6. The computer-implemented method of claim 1, wherein including the additional information in subsequently generated information sets includes:

avoiding redundant data expansion operations to reduce a processing time of the processor.

\* \* \* \* \*